United States Patent
Grana et al.

(10) Patent No.: US 11,008,922 B2
(45) Date of Patent: May 18, 2021

(54) SYSTEM AND METHOD FOR DIAGNOSING HEALTH OF AN EXHAUST AFTERTREATMENT SYSTEM

(71) Applicant: Cummins Inc., Columbus, IN (US)

(72) Inventors: Thomas A. Grana, Columbus, IN (US); Girish Chandramouli, Columbus, IN (US); Sergio M. Hernandez-Gonzalez, Greenwood, IN (US); Ravindra Kakade, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/659,945

(22) Filed: Oct. 22, 2019

(65) Prior Publication Data

US 2020/0191038 A1 Jun. 18, 2020

Related U.S. Application Data

(60) Provisional application No. 62/778,502, filed on Dec. 12, 2018.

(51) Int. Cl.
| | |
|---|---|
| *F01N 11/00* | (2006.01) |
| *F01N 3/20* | (2006.01) |
| *F01N 3/035* | (2006.01) |
| *F02D 41/14* | (2006.01) |

(52) U.S. Cl.
CPC ............. *F01N 11/00* (2013.01); *F01N 3/035* (2013.01); *F01N 3/2066* (2013.01); *F02D 41/1461* (2013.01); *F01N 2550/20* (2013.01); *F01N 2560/026* (2013.01); *F01N 2900/0418* (2013.01); *F01N 2900/0422* (2013.01)

(58) Field of Classification Search
CPC .... F02D 41/146; F02D 41/1461; F01N 11/00; F01N 2560/026; F01N 2900/0418
See application file for complete search history.

(56) References Cited

U.S. PATENT DOCUMENTS

| | | | |
|---|---|---|---|
| 6,360,159 | B1 | 3/2002 | Miller et al. |
| 7,854,161 | B2 | 12/2010 | Hjorsberg et al. |
| 8,074,445 | B2 | 12/2011 | Ofoli et al. |
| 8,091,416 | B2 | 1/2012 | Wang et al. |
| 8,109,079 | B2 | 2/2012 | Wills et al. |
| 8,141,340 | B2 | 3/2012 | Garimella et al. |
| 8,161,730 | B2 | 4/2012 | Chi et al. |
| 8,181,450 | B2 | 5/2012 | Garimella et al. |
| 8,201,394 | B2 | 6/2012 | Chi et al. |
| 8,256,208 | B2 | 9/2012 | Wills et al. |
| 8,281,572 | B2 | 10/2012 | Chi et al. |
| 8,505,278 | B2 | 8/2013 | Farrell et al. |
| 8,510,024 | B2 | 8/2013 | Gady et al. |
| 8,555,613 | B2 | 10/2013 | Wang et al. |
| 8,844,267 | B2 | 9/2014 | Levijoki et al. |
| 9,038,369 | B2 | 5/2015 | Khaled et al. |
| 9,708,961 | B2 | 7/2017 | Hall |

(Continued)

*Primary Examiner* — Jonathan R Matthias
(74) *Attorney, Agent, or Firm* — Tat Stettinius & Hollister LLP

(57) ABSTRACT

Diagnostics for inadequate performance and/or degradation of an exhaust aftertreatment system are disclosed. A performance degradation analysis of the exhaust aftertreatment system includes a determination of a long term brake specific NOx value over a time period and a comparison of the long term brake specific NOx value to a threshold value.

20 Claims, 2 Drawing Sheets

(56) References Cited

U.S. PATENT DOCUMENTS

| | | |
|---|---|---|
| 9,850,796 B2 | 12/2017 | Osborn et al. |
| 9,879,580 B2 | 1/2018 | Gupta et al. |
| 2008/0147295 A1 | 6/2008 | Sivasubramaniam et al. |
| 2009/0165543 A1 | 7/2009 | Wakahara |
| 2014/0208721 A1* | 7/2014 | Khaled .................. F01N 11/00 60/276 |
| 2017/0350291 A1 | 12/2017 | Khaled et al. |

* cited by examiner

SYSTEM AND METHOD FOR DIAGNOSING HEALTH OF AN EXHAUST AFTERTREATMENT SYSTEM

BACKGROUND

The present application relates to exhaust aftertreatment control, and more particularly to monitoring and/or diagnosing degradation of an exhaust gas aftertreatment system.

Control and monitoring of catalyst and other exhaust component performance are of increasing interest to meet modern internal combustion engine emissions standards. Existing onboard monitoring systems in exhaust aftertreatment systems monitor the individual components for degradation in performance. These monitors are required to make rapid determinations regarding the degradation conditions for the monitored component, at times with incomplete data. In addition, conditions may exist in which multiple components are partially degraded, but none are sufficiently degraded to trigger an onboard diagnostic (OBD) fault. However, the combined effect of the degradation of multiple components in the system may lead to unacceptable overall performance of the aftertreatment system.

Diagnostic systems and sensors for the individual exhaust components and engine are typically located within (onboard) a vehicle and are used to monitor operation of these components. Consequently, it would be desirable to employ these sensors in monitoring the overall performance and/or degradation of the exhaust aftertreatment system. Accordingly, further technological developments in this area are desirable.

SUMMARY

Embodiments of the present application are directed to methods and systems for diagnosing inadequate performance of an exhaust aftertreatment system. The systems and methods disclosed herein include determining brake specific NOx and, if brake specific NOx exceeds a threshold, providing an indication of inadequate performance of the aftertreatment system to the vehicle operator, service technician, and/or others. Various embodiments include assigning a confidence value to interval brake specific NOx determinations made during various time intervals within a time period so that a long term brake specific NOx for the time period is weighted toward the higher confidence interval brake specific NOx determinations.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF REPRESENTATIVE EMBODIMENTS

Figure 1:
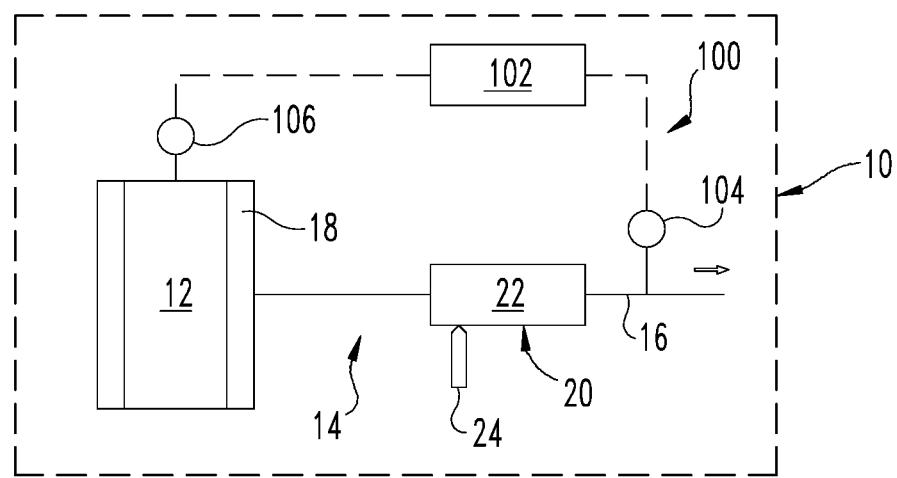
FIG. 1 is a diagrammatic view of a vehicle with an engine and an exhaust aftertreatment system and a diagnostic system coupled to the exhaust aftertreatment system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein, are contemplated as would normally occur to one skilled in the art to which the invention relates.

FIG. 1 is a diagrammatic view of a vehicle 10 including an internal combustion engine 12 coupled to an exhaust system 14. Vehicle 10 could be any of a variety of vehicle types such as a light-, medium- or heavy-duty truck, semi, bus, car, SUV, motor coach, or different variety of land traveling vehicle. In other embodiments, the vehicle 10 may be of a marine or aircraft type. In still other embodiments, engine 12 and exhaust system 14 are part of a stationary application, such as a generator set.

Generally, the internal combustion engine 12 operates to combust a mixture of fuel (e.g., gasoline, diesel, or the like or a combination thereof) and induction gas (e.g., fresh air, recirculated exhaust gas, or the like or a combination thereof) within a plurality of combustion chambers. The temperature and pressure of the exhaust gas generated upon combustion applies some force to a component of the engine 12 (e.g., a piston, a turbine blade, or the like) which is then translated into mechanical energy. Thereafter, the exhaust gas is removed from the engine 12 and conveyed to the ambient environment by way of exhaust system 14 that includes an exhaust passage 16 coupled to, for example, an exhaust manifold 18 of the engine 12.

The exhaust system 14 includes an exhaust aftertreatment system 20 disposed within the exhaust passage 16, which is configured to reduce emissions from the exhaust gas that would otherwise be released to the ambient environment. Examples of emissions within the exhaust gas include carbon monoxide (CO), hydrocarbons (HC), nitrogen oxides such as nitrous oxide (NO) and nitrogen dioxide ($NO_2$), particulate matter (PM), and the like, or a combination thereof. Collectively, oxides of nitrogen such as NO and $NO_2$ are referred to herein as NOx. As will be described in greater detail below, aftertreatment system 20 includes a diagnostic system configured to determine when an oxidation catalyst of the exhaust aftertreatment system 20 is not operating in a desired manner for effective reduction of NOx emissions.

The exhaust aftertreatment system 20 includes one or more components 22 such as, for example, an oxidation catalyst, a particulate filter, and a selective catalytic reduction (SCR) catalyst disposed within the exhaust system 14 to receive a flow of exhaust gas generated by the engine 12. The exhaust aftertreatment system 20 may also include a doser 24 operationally connected to a supply of reducing agent (not shown), such as urea or ammonia. The doser 24 has a nozzle disposed within the exhaust passage 16 so as to inject the reducing agent into the exhaust gas flow. In an alternative embodiment, the doser 24 may include a second nozzle. The system 20 may include an ammonia oxidation catalyst (AMOX) (not shown) as a separate catalyst or commingled with another catalyst, for example with a washcoat applied toward the rear portion of the catalyst that is responsive to at least partially oxidize ammonia. Still other embodiments contemplate any suitable aftertreatment component or combination of components in aftertreatment system 20 for NOx reduction.

In one embodiment, a diagnostic system 100 is provided to determine whether the aftertreatment system 20 as a whole is functioning in a desired manner for efficient operation in removing NOx. The diagnostic system 100 includes a controller 102 coupled to a system out NOx sensor 104, which can be either a physical sensor, a virtual sensor, or both, that is disposed in operable communication with exhaust passage 16 downstream of aftertreatment component(s) 22. Controller 102 is further coupled to one or more engine sensors 106 (physical, virtual or both) disposed in operable communication with engine 12 to provide an indication of one or more parameters that determine engine power, such as fuel consumption, engine speed, intake and exhaust manifold pressures and temperatures, for example.

In one embodiment, the NOx sensor 104 may be provided as a NOx sensor configured to detect a NOx composition in the exhaust gas conveyed by the exhaust passage 16 and generate a sensor signal corresponding to the amount of NOx in the exhaust gas. Therefore, the NOx sensor 104 is configured to generate a first sensor signal corresponding to the detected or calculated NOx amount at a location downstream of the aftertreatment components 22, such as a tailpipe or system out NOx amount. Sensor signals generated by the NOx sensor 104 can be transmitted to the controller 102 over any suitable wired or wireless transmission medium.

In addition, sensors can be provided that measure or detect performance and/or aging conditions of individual ones of the components 22 of the aftertreatment system 20, such as a degradation condition, the cumulative hours of regeneration, accumulated temperature time data, miles, and hours of operation of an individual component, for example. Other sensors can be provided to measure or determine the mass flow through the exhaust system, the temperature of any component of the aftertreatment system 20 or of the exhaust gas, the amount of ammonia stored in a catalyst, etc. The illustrated sensors are exemplary only, and other sensors may be present that are not illustrated. Further, certain sensors may instead be virtual sensors that are calculated from other parameters available to the system, or values that would be indicated by sensors may instead be supplied to a computer readable memory location, via a datalink or network communication, or otherwise be made available to the system where the sensor providing the sensed parameter is not a part of the defined system.

Controller 102 includes a number of modules or other suitable configuration structured to functionally execute operations for diagnosing a poorly or improperly performing aftertreatment system 20. In certain embodiments, the controller 102 forms a portion of a processing subsystem including one or more computing devices having memory, processing, and communication hardware. The controller 102 may be a single device or a distributed device, and the functions of the controller 102 may be performed by hardware or by execution of instructions encoded on a computer readable medium. The controller 112 may be in communication with any sensor, actuator, datalink, and/or network in the system.

In certain embodiments, the controller 102 is configured to determine a tailpipe NOx amount and an estimate of exhaust mass flow. The NOx amount and exhaust mass flow are used to estimate a NOx mass flow, which is integrated over a time interval to determine total NOx mass in the time interval. Engine power is also determined during the time interval and integrated over that time interval to calculate total work for the engine over the time interval. The ratio of these values for the total NOx output over the time interval and the engine work over the time interval is the brake specific NOx for the time interval.

Other information that characterizes operating conditions during the interval are also determined. This information is used by controller 102 to determine the confidence that the calculate brake specific NOx value accurately describes the performance of the system over the time interval. Each of the interval brake specific NOx values determined during a time period are assigned a confidence value to appropriately weight the impact of the interval brake specific NOx determination on the long term brake specific NOx value for the time period. Example conditions for the NOx determination to operate with higher confidence include a NOx sensor output value being within a rational range, the NOx sensor output value being lower than a threshold value (e.g. not near the top of the operating range such that it might become unreliable), that ambient air pressure is within a normal range, that an $NH_3$ slip estimate is within a normal range, that an $NO_2$ slip estimate is within a normal range, that a catalyst temperature is within or outside of a desired operating temperature range, and/or and an ammonia to NOx ratio being within a desired range.

The long term brake specific NOx value is thus calculated using a filtering scheme that employs confidence values so that interval brake specific NOx values that determined with higher confidence are weighted more in the long term brake specific NOx value. In response to the long term brake specific NOx value exceeding a threshold value associated with an improper or poorly functioning aftertreatment system, a notification can be provided to the operator indicating servicing of the aftertreatment system 20 is required.

Figure 2:
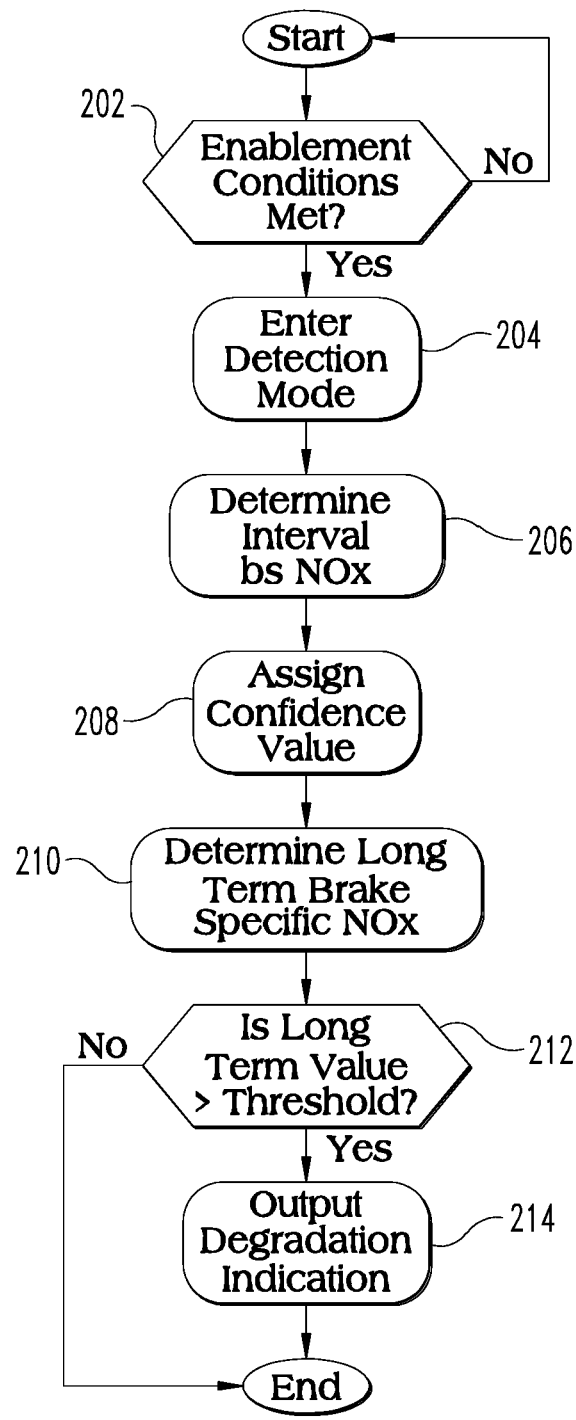
FIG. 2 is a flow diagram of one embodiment of a procedure for aftertreatment system diagnostics.

In another aspect of the present disclosure, a procedure 200 is provided such as shown in FIG. 2. Procedure 200 includes an operation 204 to enter a detection mode of operation for an interval brake specific NOx value determination over one or more time intervals of an associated time period. One or more enablement conditions may be required to be present at conditional 202 before entering the detection mode at operation 204. For example, one or more operating conditions that provide information regarding operation of engine 12 and/or exhaust system 14 can be determined to enable entering the detection mode and/or to assign confidence value(s) to an interval brake specific NOx value.

The enablement and/or confidence weighted operating conditions may include, but are not limited to, one or more of the following: a catalyst temperature and/or associated temperature threshold, a NOx concentration, an ammonia to NOx ratio, an ammonia amount, temperature of engine 12, a speed of engine 12, a temperature of the exhaust gas, a flow rate of exhaust gas, a reductant amount being dosed or reductant dosing being disabled, a temperature of a particulate filter, a regeneration status and/or soot loading condition, a time of operation in a particular operating zone, etc. Any one or combination of suitable operating criteria which enable the NOx detection mode at operation 204 are contemplated. In addition, any one or combination of the conditions can be evaluated to determine a confidence value to assign to the interval brake specific NOx value.

Procedure 200 continues at operation 206 to determine the interval brake specific (bs) NOx value for the associated time interval. The time interval can be any suitable time period associated with operation of engine 12, such as a few seconds to several minutes. In one embodiment, the time interval is less than 10 hours of operation. Procedure 200 continues at operation 208 to assign a confidence value to the interval brake specific NOx value based on the operating conditions as discussed above.

At operation 210 a long term brake specific NOx value for a time period including a number of time intervals is determined that is a function of the previous long term brake specific NOx value, the current interval brake specific NOx value, and the associated confidence value. A number of confidence weighted interval brake specific NOx values can be used to determine the long term brake specific NOx value for the associated time period.

Any suitable time period is contemplated for the determination of a long term brake specific NOx value. For example, the time period can run for tens of minutes up to several weeks, and the time intervals within the time period can run several seconds or minutes. In one embodiment, the time period is less than 500 hours. In another embodiment, the time period is comprised of a number of interval brake specific NOx events, such as the last 100 brake specific NOx events.

Procedure 200 continues at conditional 212 to determine if the long term brake specific NOx value is greater than a threshold value indicative of a degraded aftertreatment system. If conditional 212 is yes, then procedure 200 continues at operation 214 to output a degradation condition. If conditional 212 is negative, then procedure 200 can end until initiated for another interval brake specific NOx value determination.

In one embodiment, the diagnostic is run outside of the OBD system for the aftertreatment components such that an amber warning lamp or other suitable indicator is provided to the operator in response to the long term brake specific NOx being greater than a threshold value. The indicator alerts the driver or operator that service is required in order to isolate the component or components causing the overall degraded operation of the system, even if the components individually have not degraded sufficiently to trigger their own fault code or warning.

The descriptions herein provide illustrative embodiments of performing procedures for diagnosing failure or degradation in an exhaust aftertreatment system. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

As is evident from the figures and text presented above, a variety of aspects related to the disclosure herein are contemplated. According to one aspect, a method for aftertreatment system diagnostics includes determining an interval brake specific NOx value for one or more time intervals of a time period associated with operation of an internal combustion engine; assigning a confidence value to the interval brake specific NOx value; determining a long term brake specific NOx value for the time period based on the interval brake specific NOx value and the confidence value associated therewith; comparing the long term brake specific NOx value to a threshold value; and providing an indication of an aftertreatment system degradation condition in response to the long term brake specific NOx value being greater than the threshold value.

In one embodiment, the interval brake specific NOx value is a ratio of total NOx output by the engine to total work of the engine over the time interval. In one refinement of this embodiment, the total NOx output is determined by integrating NOx mass flow over the time interval and the total work is determined by integrating engine power over the same time interval. In a further refinement, the NOx mass flow is based on tailpipe NOx measurements and exhaust mass flow.

In another embodiment, the confidence value is based on one or more operating conditions associated with determining a NOx amount. In a refinement of this embodiment, the one or more operating conditions include one or more of a catalyst temperature, a NOx concentration, and an ammonia to NOx ratio.

In another embodiment, determining the long term brake specific NOx value is based on a previous long term brake specific NO value, a latest interval brake specific NOx value, and the confidence value for the latest interval brake specific NOx value.

According to another aspect, a method for aftertreatment system diagnostics includes determining an interval brake specific NOx value for a plurality of time intervals within a time period associated with operation of an internal combustion engine, the interval brake specific NOx value including a confidence value; determining a long term brake specific NOx value for the time period based on the plurality of interval brake specific NOx values and the confidence values associated therewith; and determining the aftertreatment system is degraded in response to the long term brake specific NOx value being greater than a threshold value indicative of a degraded aftertreatment system.

In one embodiment, the interval brake specific NOx value is a ratio of total NOx output by the engine to total work of the engine over the time interval. In a refinement of this embodiment, the total NOx output is determined by integrating NOx mass flow over the time interval and the total work is determined by integrating engine power over the same time interval. In a further refinement, the NOx mass flow is based on tailpipe NOx measurements and exhaust mass flow.

In another embodiment, determining the long term brake specific NOx value is based on a previous long term brake specific NO value, a latest interval brake specific NOx value, and the confidence value for the latest interval brake specific NOx value.

According to another aspect, an apparatus includes an exhaust aftertreatment system including at least one catalyst and at least one NOx sensor and a programmable controller in communication with the at least one NOx sensor. The controller is configured to determine an interval brake specific NOx value for one or more time intervals of a time period associated with operation of the exhaust aftertreatment system, assign a confidence value to the interval brake specific NOx value, determine a long term brake specific NOx value for the time period based on the interval brake specific NOx value and the confidence value associated therewith, and output an indication of an aftertreatment system degradation condition in response to the long term brake specific NOx value being greater than a threshold value.

In one embodiment, the interval brake specific NOx value is a ratio of total NOx output by the engine to total work of the engine over the time interval. In a refinement of this embodiment, the total NOx output is determined by integrating NOx mass flow over the time interval and the total work is determined by integrating engine power over the same time interval.

In another embodiment, the apparatus includes an output device connected to the controller, and the output device includes an indicator that is activated in response to the aftertreatment system degradation condition. In a refinement of this embodiment, the output device comprises a malfunction indicator light.

In another embodiment, the time interval is less than 10 hours of operation and the time period is less than 500 hours of operation. In yet another embodiment, the controller is configured to determine the long term brake specific NOx value based on a previous long term brake specific NOx value, a latest interval brake specific NOx value, and the confidence value for the latest interval brake specific NOx value.

In another embodiment, the apparatus is part of a system comprising an internal combustion engine structured to provide an exhaust stream containing NOx to the aftertreatment system.

Any theory, mechanism of operation, proof, or finding stated herein is meant to further enhance understanding of embodiments of the present invention and is not intended to make the present invention in any way dependent upon such theory, mechanism of operation, proof, or finding. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

While embodiments of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method for aftertreatment system diagnostics, comprising:
    determining an interval brake specific NOx value for one or more time intervals of a time period associated with operation of an internal combustion engine;
    assigning a confidence value to the interval brake specific NOx value;
    determining a long term brake specific NOx value for the time period based on the interval brake specific NOx value and the confidence value associated therewith;
    comparing the long term brake specific NOx value to a threshold value; and
    providing an indication of an aftertreatment system degradation condition in response to the long term brake specific NOx value being greater than the threshold value.

2. The method of claim 1, wherein the interval brake specific NOx value is a ratio of total NOx output by the engine to total work of the engine over the time interval.

3. The method of claim 2, wherein the total NOx output is determined by integrating NOx mass flow over the time interval and the total work is determined by integrating engine power over the same time interval.

4. The method of claim 3, wherein the NOx mass flow is based on tailpipe NOx measurements and exhaust mass flow.

5. The method of claim 1, wherein the confidence value is based on one or more operating conditions associated with determining a NOx amount.

6. The method of claim 5, wherein the one or more operating conditions include one or more of a catalyst temperature, a NOx concentration, and an ammonia to NOx ratio.

7. The method of claim 1, wherein determining the long term brake specific NOx value is based on a previous long term brake specific NO value, a latest interval brake specific NOx value, and the confidence value for the latest interval brake specific NOx value.

8. A method for aftertreatment system diagnostics, comprising:
    determining an interval brake specific NOx value for a plurality of time intervals within a time period associated with operation of an internal combustion engine, the interval brake specific NOx value including a confidence value assigned thereto;
    determining a long term brake specific NOx value for the time period based on the plurality of interval brake specific NOx values and the confidence values associated therewith; and
    determining the aftertreatment system is degraded in response to the long term brake specific NOx value being greater than a threshold value indicative of a degraded aftertreatment system.

9. The method of claim 8, wherein the interval brake specific NOx value is a ratio of total NOx output by the engine to total work of the engine over the time interval.

10. The method of claim 9, wherein the total NOx output is determined by integrating NOx mass flow over the time interval and the total work is determined by integrating engine power over the same time interval.

11. The method of claim 10, wherein the NOx mass flow is based on tailpipe NOx measurements and exhaust mass flow.

12. The method of claim 8, wherein determining the long term brake specific NOx value is based on a previous long term brake specific NO value, a latest interval brake specific NOx value, and the confidence value for the latest interval brake specific NOx value.

13. An apparatus, comprising:
    an exhaust aftertreatment system including at least one catalyst and at least one NOx sensor; and
    a programmable controller in communication with the at least one NOx sensor, the controller being configured to determine an interval brake specific NOx value for one or more time intervals of a time period associated with operation of the exhaust aftertreatment system, assign a confidence value to the interval brake specific NOx value, determine a long term brake specific NOx value for the time period based on the interval brake specific NOx value and the confidence value associated therewith, and output an indication of an aftertreatment system degradation condition in response to the long term brake specific NOx value being greater than a threshold value.

14. The apparatus of claim 13, wherein the interval brake specific NOx value is a ratio of total NOx output by the engine to total work of the engine over the time interval.

15. The apparatus of claim 14, wherein the total NOx output is determined by integrating NOx mass flow over the time interval and the total work is determined by integrating engine power over the same time interval.

16. The apparatus of claim 13, further comprising an output device connected to the controller, wherein the output device includes an indicator that is activated in response to the aftertreatment system degradation condition.

17. The apparatus of claim 16, wherein the output device comprises a malfunction indicator light.

18. The apparatus of claim 13, wherein the time interval is less than 10 hours of operation and the time period is less than 500 hours of operation.

19. The apparatus of claim 13, wherein the controller is configured to determine the long term brake specific NOx value based on a previous long term brake specific NOx value, a latest interval brake specific NOx value, and the confidence value for the latest interval brake specific NOx value.

20. The apparatus of claim 13, wherein the apparatus is part of a system comprising an internal combustion engine structured to provide an exhaust stream containing NOx to the aftertreatment system.

\* \* \* \* \*